May 7, 1940.   C. G. OLSON   2,200,227
METHOD AND MEANS FOR FASTENING
Filed March 12, 1938
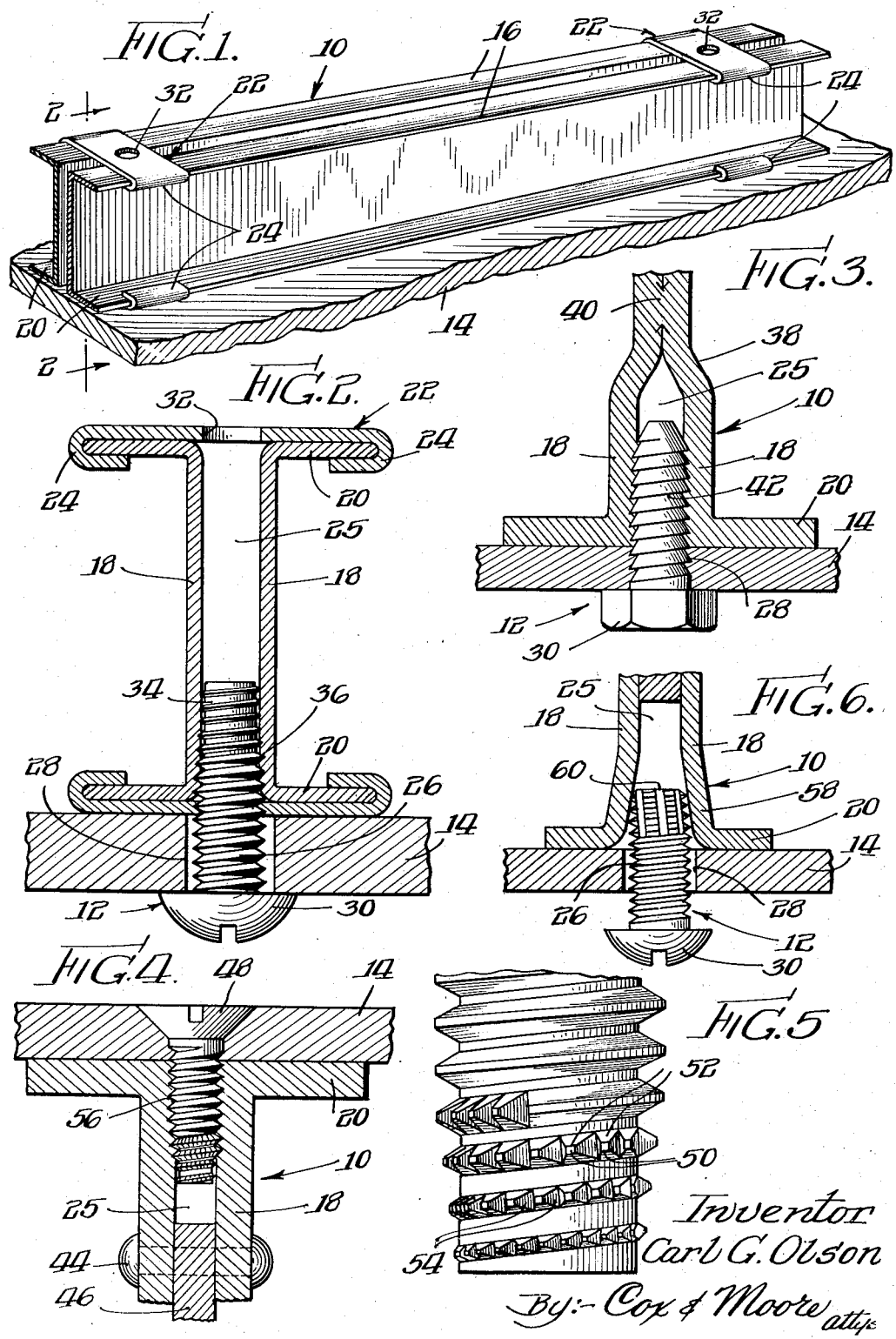
Inventor
Carl G. Olson
By:— Cox & Moore attys Patented May 7, 1940

2,200,227

UNITED STATES PATENT OFFICE 2,200,227

METHOD AND MEANS FOR FASTENING

Carl G. Olson, Chicago, Ill., assignor to Illinois Tool Works, Chicago, Ill., a corporation of Illinois Application March 12, 1938, Serial No. 195,583

6 Claims. (Cl. 189—36)

The present invention relates to the securement of work pieces together and more particularly to a method and means for securing and attaching structural parts to framing members, particularly in the assembly of structures having metal frames.

The present invention contemplates the use of a screw threaded fastener in combination with a framing member such as a beam or riser having a slot, the opposed sides of which oppositely engage the fastener and anchor it to the frame.

It is an object of the present invention to provide a structure as above, together with the method for assembling the structure, wherein the framing member is provided with wall sections providing a slot, which wall sections are so arranged as to have some resiliency and are spaced a distance less than the diameter of the fastener so that the fastener may be driven into this space to form complementary thread engaging portions on the wall sections for retaining the fastener and anchoring it securely to the framing member.

Another object of this invention is to provide a threaded fastener with means to cut corresponding threads on the opposed faces of the wall members, the cutting means being so arranged and positioned that they are adapted to interengage with the portions of the wall members which are in contact with the fastener at all rotational positions of the fastener so that they tend to interlock and resist unauthorized displacement of the parts.

More specifically the present invention contemplates the application of a thread forming fastener between opposed, substantially flat walls which are so spaced as to readily permit entry of the fastener into the intermediate space, as well as actuation therein to cut or form thread sections on the interior flat walls without preliminary drilling, tapping or other preparation.

It is, therefore, a further object of the present invention to provide a simple, efficient and practical method for fastening wall panels and the like to framing structure which may be of metal and wherein the fasteners are applied at any position along the frame elements and without special prefabrication of the points of attachment.

Numerous other objects and advantages will more fully appear during the course and progress of the following specification.

Figure 1 is a perspective view showing a wall section secured to a framing member in accordance with the present invention.

Figure 2 is a sectional elevation taken on the line 2—2 of Figure 1.

Figures 3 and 4 are sectional elevations showing an alternative preferred fastening.

Figure 5 is an enlarged detail elevational view of the entering end of the fastener shown in Figure 4.

Figure 6 is an alternative preferred fastening arranged in accordance with the present invention.

Referring to the drawing more in detail wherein like numerals have been employed to designate similar parts throughout the various views, it will be seen that, for purposes of illustrating one practical embodiment of the invention, there has been shown in Figures 1 and 2, a structural assembly comprising a framing element designated generally by the reference numeral 10 having secured thereto a section of wall, flooring or ceiling 14, through the agency of a screw threaded fastener designated by the numeral 12. The framing member 10 comprises a pair of oppositely disposed channels 16, each channel having a rear or base wall 18 and terminating in a pair of parallel flanges 20. Attention is directed to the fact that the two channels are arranged in co-extensive, parallel relationship with their respective base walls 18 oppositely disposed and in spaced, parallel relationship. The spacing of the channels is controlled by the plurality of clips 22 of flat strip material which have turned-over, hook-like ends 24 adapted to engage about the free edges of the oppositely extending flanges 20. The hook portions 24 may be such as to firmly engage the channels against inward displacement or they may be loosely positioned as shown. In any event it will be obvious from this disclosure that the spacing of the walls provides a slot 25 of subtantially fixed, predetermined width for a purpose which will be hereinafter described more in detail.

The fastener, as shown in Figure 2, has a screw threaded portion 26 which extends freely through an aperture 28 in the flat wall member 14 and has a suitable head 30 for engaging said wall member against displacement. The other end of the fastener is situated through the aperture 32 in the clip 22 and extends between the walls 18 of the channel members. Attention is particularly directed to the fact that the spacing of the wall members 18 as determined by the clip members 22 is less than the outer or body diameter of the screw threads throughout the area of their normal configuration.

The fastener shown has threads 34 adjacent its entering end which gradually taper from the aforesaid normal size and configuration to substantially disappear at the end of the fastener. In the particular type of fastener shown, the root diameter is substantially the same throughout the axial length, while the pitch or spacing of the tapering threads remains the same, the decreasing radial elevation of the threads being in effect secured by progressively lowering the radial elevation of the thread sections above the root portion.

The spacing of the wall members 18 of the channels is, on the other hand, preferably sufficient to permit ready entry and introduction of the entering end of the fastener 12 therebetween. Accordingly, as the screw threaded fastener is introduced through the aperture 32 into the aforesaid space formed by the walls 18 and rotated therein in the usual manner of driving a fastener, complementary thread sections will be formed on the opposed, flat, inner surfaces of the two walls, as indicated at 36. While these so formed complementary thread sections engage only a portion of the periphery of the fastener, they will nevertheless interlock therewith to anchor the fastener against withdrawal, as well as displacement in the plane of the slot.

The fastener will preferably be entered into the slot a distance sufficient to engage a plurality of the normally formed convolutions of the thread with the work piece. It should be noted that the shank of the fastener 12 passes through the aperture 32 in the clip 22 so that the expansive forces created by the driving of the fastener are distributed directly to the opposite hook portions 24 of the clip. For many purposes the fastener need not be driven directly through the clip, as shown in this embodiment, but may be situated in the slot at points intermediate of the clip in substantially the same manner, as has been just described.

In Figure 3 there is shown a section through a modified fastening constructed in accordance with the principles of the present invention, which fastening omits in large measure the necessity for clip members shown in Figures 1 and 2. The framing element 10 (Figure 3) comprises a pair of channel members being arranged in coextensive, parallel relationship with flanged portions 20 oppositely projecting. The base portions of the channel are distorted inwardly and toward each other as at 38 to provide inwardly offset wall sections which are welded together flatwise as at 40. Accordingly, it will be seen that the framing member 10 is a one-piece structure having a slot 25 of limited depth extending along one edge. The fastener 12 (Figure 3) has a continuous screw thread 42 of the buttress type. In other words, the thread is provided with an inclined leading flank and a substantially radially extending following flank. Here, also, the proportioning of the fastener is such that it may enter the slot 25, as shown in Figure 3, and form complementary thread engaging sections on the inner surfaces of the parallel walls 18.

Attention is directed to the fact that this fastener may be inserted through the aperture 28 in the wall section 14 and driven substantially completely into place by means of a hammer, being given a final rotational turn by means of a screw driver for tensioning the parts in the position shown. It is thought that it will be understood that the fastener shown could not, as a practical matter, be driven in this manner into a drilled aperture having the transverse dimension of the slot 25, particularly if the work piece was of relatively hard metal. The present novel result is, accordingly, believed due in large measure to the fact that the wall sections 18 have some resiliency.

Figures 4 and 5 disclose an important preferred application of the present invention. The framing element 10 in these figures comprises the channels, the base or rear walls 18 of which are riveted together as at 44 after interposing a suitable spacing plate 46 therebetween for providing the fixed slot 25. The fastener has a flat head 48, the threads being configurated generally as described in connection with the first mentioned embodiment, namely, with the threads decreasing gradually in size toward the entering end.

Referring more specifically to the enlarged view shown in Figure 5, it will be seen that the thread substantially throughout the tapering portion thereof is interrupted by a series of transverse, V-shaped cuts or slots to provide a plurality of pyramidal-shaped teeth 50. Preferably each of these teeth has a front flank 52 which is steeper with respect to the radius of the fastener than the rear flank 54. In this manner the edges bounding the front flank 52 are in effect cutting edges. As the fastener is rotated in a righthand direction for the purpose of driving it into the slot 25, shown in Figure 4, each of the pyramidal projections 50 provides an abrading or cutting tooth. In other words, since each of the projections 54 is successively larger than the previous projection, it tends to engage in the segment of the complemental thread engaging sections formed in the work by the preceding projection and to remove or abrade therefrom an additional increment of material. In this manner thread sections are progressively formed on the inner faces of the walls 18 to engage the normally shaped, uninterrupted thread sections 56 on the body of the fastener.

The projections 54 clearly, when interengaging with the inner faces of the walls 18, have a locking action which tends to resist unauthorized or inadvertent withdrawal or loosening of the fastener. To this end it should be noted that the projections are spaced quite closely together so that at all times two or more of these members will be in interengagement with the work piece regardless of the rotational position of the fastener.

Figure 6 discloses still another practical application of the present invention. In this embodiment the parallel, opposed wall portions 18 of the framing element 10 are flared outwardly as at 58 to accommodate tapping fasteners of the type which has an entering end which is of substantially unreduced transverse dimensions. The fastener shown in this figure is provided with a spiral thread 26 interrupted adjacent the entering end by a plurality of slots 60 which are normal to the direction of the thread and provide thread cutting edges on either side of the slots.

In use, the fastener may be inserted through the aperture 28 in the wall member 14 and into the flared portion of the slot 25, namely, into the position shown in Figure 6. When being rotated and driven, as viewed in the figure, the leading edges of the thread sections formed by the slots 60 will cut material from the opposed faces of the opposite walls 18 in the form of complemental thread sections adapted to engage the thread sections 26 upon the fastener. As in the previously described embodiment it is preferred that the slots 60 be so arranged and proportioned that cutting edges formed thereby will always be in contact with the metal of the walls 18 so that there is a constantly available locking action against unauthorized reverse actuation of the fastener.

From the foregoing it will be apparent that the present invention has many practical applications in the field where structural elements must be fastened to metallic framing or supporting members. The resiliency of the opposed slot forming walls may be caused to cooperate with the fastener in order to oppositely and clampingly engage it with a force tending to prevent loosening in service and at the same time to facilitate the application of the fastener to the slot by the use of a minimum of force. In other words, some resiliency in these members will enhance the ready insertion and the starting of the fastener within the slot 25 after which time cutting of the threads will take place upon further actuation and rotation of the threaded shank within the slot. This invention is particularly applicable to the use of fasteners which ordinarily would present difficulty in application to unthreaded cylindrical apertures.

According to the present invention the work pieces may be provided in ready-made standard sizes and/or lengths. It is unnecessary to specially fabricate the parts in accordance with the positioning of the fasteners since the fasteners may be applied to the slot at any position along the length of the supporting frame and will cut or form their own thread sections at the point where they are inserted or driven.

The present invention provides a simple and effective practical fastening means and method wherein a wide variety of fasteners may be applied at substantially any desired position and may be driven or applied by known standard tools.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. In combination, a structural framing member comprising spaced walls having opposed, spaced faces arranged in substantially flat parallel planes and providing an elongated slot therebetween, and means holding said walls from spreading; and a threaded fastener extending transversely of the slot between the spaced walls and engaging threads on the walls formed by the fastener as it is driven into the slot.

2. In combination, a structural element comprising spaced walls having opposed, spaced faces arranged in substantially flat parallel planes and providing an elongated slot therebetween, and means holding said walls from spreading; and a threaded fastener having a diameter greater than the spacing of said faces and extending transversely of the slot between the spaced walls and engaging threads on the walls formed by the fastener as it is driven into the slot.

3. In combination, a structural framing member comprising spaced walls having opposed, spaced faces arranged in substantially flat parallel planes and providing an elongated slot therebetween, and means holding said walls from spreading; and a threaded fastener extending transversely of the slot between the spaced walls and engaging threads on the walls formed by the fastener as it is driven into the slot, said spaced faces being elastically yieldable for elastically grasping said threaded fastener.

4. In combination, a structural framing member comprising spaced walls having opposed, spaced faces arranged in substantially flat parallel planes and providing an elongated slot therebetween, and means holding said walls from spreading; and a threaded fastener extending transversely of the slot between the spaced walls and engaging complemental, arcuate thread segments on the walls formed by the fastener as it is driven into the slot.

5. In combination, a structural framing member comprising spaced walls having opposed, spaced faces arranged in substantially flat parallel planes and providing an elongated slot therebetween, and means holding said walls from spreading; and a threaded fastener extending transversely of the slot between the spaced walls and engaging threads on the walls formed by the fastener as it is driven into the slot, said fastener having a substantially helical thread terminating in a thread of decreasing height adjacent the entering end, said thread, at the portion of decreasing height, being interrupted at a plurality of spaced points whereby to form a plurality of cutting edges for cutting complemental threads in said wall and for anchoring the fastener thereto at all relative positions.

6. In combination, a structural framing member comprising spaced walls having opposed, spaced faces providing an elongated slot therebetween, and means holding said walls from spreading; and a threaded fastener extending transversely of the slot between the spaced walls and engaging threads on the walls formed by the fastener as it is driven into the slot.

CARL G. OLSON.